United States Patent [19]

Bishop

[11] Patent Number: 4,894,928
[45] Date of Patent: Jan. 23, 1990

[54] SUBTERRANEAN GRAIN STORAGE

[75] Inventor: William M. Bishop, Katy, Tex.

[73] Assignee: PB-KBB, Inc., Houston, Tex.

[21] Appl. No.: 176,051

[22] Filed: Mar. 31, 1988

[51] Int. Cl.⁴ .............................................. F26B 19/00
[52] U.S. Cl. ......................................... 34/60; 34/218; 34/36
[58] Field of Search ................ 34/37, 36, 20, 165–167, 34/60; 62/260; 165/45; 98/50, 52, 55, 51

[56] References Cited

U.S. PATENT DOCUMENTS

| | | | |
|---|---|---|---|
| 26,481 | 12/1859 | Doyere | 98/55 |
| 2,097,723 | 11/1937 | Ewing et al. | 62/260 |
| 2,830,911 | 4/1958 | Fogelberg | 34/37 |
| 3,165,054 | 1/1965 | Behlen et al. | 98/55 |

Primary Examiner—Henry Bennett
Attorney, Agent, or Firm—David A. Rose

[57] ABSTRACT

A subterranean cavern having gas impermeable walls is used to store grain. The cavern has a controlled atmosphere without oxygen and preferably has an atmosphere of nitrogen. Access is provided to the cavern from the surface for the loading and outloading of the grain stored in the cavern. The grain is loaded into the cavern by conveying the grain to the access and then either allowing the grain to fall through the access into the cavern or by pneumatically conveying the grain into the cavern. The grain is outloaded from the cavern by a pneumatic conveyance system.

29 Claims, 3 Drawing Sheets

SUBTERRANEAN GRAIN STORAGE

BACKGROUND OF THE INVENTION

This invention relates to the storage of grain in underground storage caverns, and more particularly, to apparatus and methods of storing grain in salt caverns and the loading and unloading of grain from the underground cavern.

The United States every year stores billions of bushels of surplus grain. The high stocks of grain are the result of low grain exports caused by the high prices for United States grains brought on by the Government's price support programs and a falling demand from grain importing countries as well as due to the normal requirement to store supplies from one season to the next. Because of the support program, the United States Department of Agriculture must locate storage space for the billions of bushels of grain. The United States faces a critical grain storage shortage, particularly in the corn belt, where most storage facilities are full. The country's estimated on-farm and commercial storage capacity is 23 billion bushels. However, much of the storage increase in recent years was in the form of temporary or non-traditional storage. Much of the emergency or temporary storage is to be replaced with more permanent storage.

There are two traditional types of grain storage facilities, the country elevator and the terminal facility. The country elevator is located close to the farmer and receives the farmer's initial shipments of grain at harvest. As the harvest season approaches, the country elevator will have stored grain moved to a terminal facility where it is stored for longer periods of time, pending sale to grain processors, users or export sales. Oftentimes the grain is stored in a terminal facility from three to five years. Physical storage times are generally short to prevent spoilage. Grain movement is normally by truck and rail.

Present grain storage facilities include silos and bins. The grain with high moisture content is dried in dryers prior to storage to remove excess moisture. This process reduces the danger of deterioration and permits the safe storage of the grain. The grain is oftentimes cleaned or aspirated to remove unwanted material as well as to improve the quality of the grain. Grain is sometimes mixed or blended with other grain in an effort to make a new lot which will be of an improved quality.

The Uniform Grain Storage Agreement with the U.S. Department of Agriculture's Commodity Credit Corporation requires that a federal license be issued by the U.S. Warehouse Act License Branch for any approved storage facility to insure that the facility meets required standards of the Commodity Credit Corporation. One of the federal license requirements includes the requirement that the facility be able to remove from storage, within thirty (30) working days, all of the grain for which the warehouse is or may be approved under the Uniform Grain Storage Agreement. However, it is not necessary that the removal capacity exceed 200 rail cars per day. In addition, there are moisture limits over which the Commodity Credit Corporation will not accept grain delivery. The Commodity Credit Corporation does not require that insurance be carried on Commodity Credit Corporation stored grain. Generally, the Commodity Credit Corporation utilizes grain storage filling the lowest cost facilities first and emptying them last. However, with the large grain surpluses and shortages in storage capacity, just about all of the storage space is being used at the present time.

In recent years, because of U.S. agricultural policies and because of the green revolution in Asia and now beginning in Africa, there has been a large year-to-year surplus of grain in the United States. This trend indicates that there is a growing need for grain storage capability, especially long-term storage. This continuing world surplus simply increases and lengthens the demand for storage and may ultimately require comparable storage in foreign countries.

Present grain storage facilities have used controlled atmospheres, especially nitrogen or carbon dioxide, for the storage of grain. High concentrations of these gases totally eliminate insects and virtually eliminate the growth of bacteria and fungi. Such controlled atmospheres also do not leave a chemical residue which can be of concern. These gases also eliminate any possibility of explosion or corrosion. One of the distinct disadvantages of present storage facilities is that such facilities are never truly air tight and require repeated applications of the nitrogen or carbon dioxide.

Experiments have shown that grain may be maintained in good condition for long periods of time while maintained in partial nitrogen atmospheres. With pure nitrogen and cooling, ten-year storage appears feasible, raising the possibility of national emergency grain storage in this and other countries. Results of tests have shown that grain with a 12.6% moisture content has virtually unchanged germination after 170 weeks. Grain has been found still fertile in air-tight Chinese tombs after 6,000 years.

Conventional storage structures have the disadvantage of providing a high surface to volume ratio of the grain thus allowing wide temperature fluctuations. Temperatures may rise to the point where the grain is destroyed. Thus, deterioration of grain is greatly retarded by lowering the storage temperature as well as the removal of oxygen.

It is known to store compressed air, gas, and liquid hydrocarbon products in subsurface storage caverns. Such storage caverns may be in salt, in hard rock, in depleted oil and gas reservoirs, in aquifers, and in mines. For example, strategic petroleum reserves are stored in underground salt caverns. Such salt caverns are developed in embedded formations or domes by conventional mining or by solution mining.

Oftentimes an underground salt cavern is developed for particular operating conditions and desired storage volume. The pre-designed salt cavern is formed using a leaching process conducted via wells which can extend to depths of several thousand feet depending upon the requirements and geological conditions. The leaching process includes drilling a borehole and setting casing into the salt formation, feeding fresh water through the casing to the cavern bottom and recovering the brine formed from the fresh water and salt through the inner annulus of the well casing. Indirect leaching feeds fresh water via the inner annulus into the upper region of the cavern and the brine in the lower region of the cavern is withdrawn via the flow bore of the casing string.

Products which have been stored or disposed in salt caverns include liquefied and gaseous hydrocarbons, compressed air, waste products in solid or liquified form, crude oil, LPG, NGL industrial and commercial gases such as ethylene, propylene, ethane, and refined oil products.

It is an object of the present invention to overcome the deficiencies of the prior art and utilize an underground storage facility which will store grain in a nitrogen or other controlled gaseous atmosphere. The present invention will further provide means for loading the underground storage cavern with grain and means for outloading the grain from the cavern through the well of the cavern.

Other objects and advantages of the invention will appear from the following description.

SUMMARY OF THE INVENTION

The present invention includes apparatus and methods of storing grain in an underground facility such as a salt cavern. The cavern stores the grain and maintains the grain in a nitrogen or other controlled atmosphere within the cavern. A gravity flow or pneumatic loading system is provided for filling the cavern with grain and a pneumatic outloading system is provided for removing the grain. It is anticipated that the grain may be stored in the cavern for as long as required, up to ten years or more.

Underground storage offers definite advantages over conventional above-ground storage. Storage caverns incur considerably less development costs and, therefore, are more economical to establish and operate than above-ground installations of comparable storage capacity. The space requirements for the above-ground portion of the operating installations is extremely small. The grain is protected against operational hazards as well as against external natural hazards. The possible impairment of the environment at the storage facility is greatly reduced.

BRIEF DESCRIPTION OF THE DRAWINGS

For a detailed description of a preferred embodiment of the invention, reference will now be made to the accompanying drawings wherein.

DESCRIPTION OF PREFERRED EMBODIMENT

The present invention includes a subterranean facility for the storage of grain. The underground facility may include caverns in sedimentary formations or in hard rock. The cavern may be made by solution mining in any dissolvable deposit such as, for example, potash. Any evaporitic deposit may be utilized or the space may be produced by conventional mining. The type of underground facility used for the grain storage will depend upon the geological formations available, preferably one which is in a geographic area of grain production, such as the State of Kansas in the United States, or a location that has proximity to rail transport.

Salt storage caverns occur in great abundance (salt domes, stratified salt) and, due to the impermeability of the salt, offers ideal characteristics for use as underground storage. Salt storage caverns are generally created by solution mining, although mechanical excavation is also possible. The cavern used can also be a naturally formed cavern.

Hard rock cavern storage can be constructed in most rock types—igneous, metamorphic, sedimentary—and, therefore, offers a broad spectrum of possible site locations. Excavation in hard rock affords storage with a high degree of protection from external influence, both for the grain as well as for the environment. The geotechnical properties of the rock, such as permeability, formation pressures and dimensional stability are the more important parameters in the selection and design of a storage facility in such a cavern.

Under certain conditions, depleted or abandoned mines can be suitable as underground storage facilities. Excavated chambers of the mine may be used for storage purposes provided there is a suitable tightness in the walls of the mine.

Figure 1:
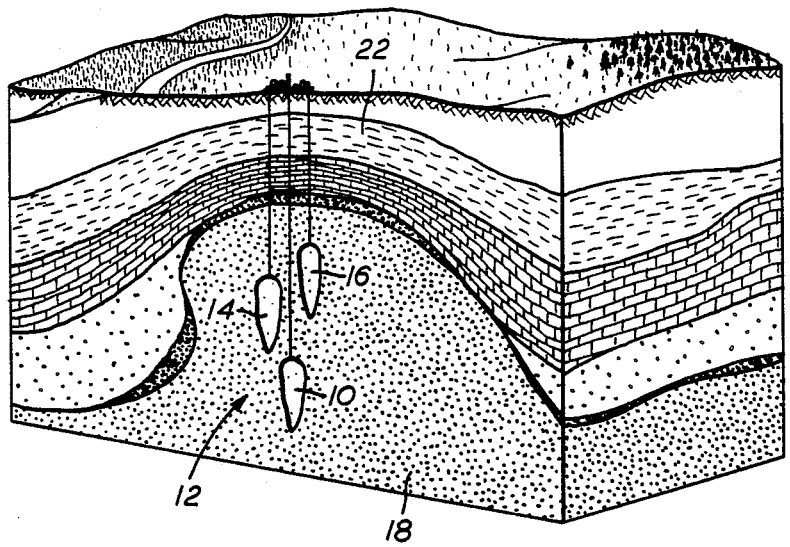
FIG. 1 is a schematic of an elevation view of the cavern field with one or more underground grain storage facilities.

Referring initially to FIG. 1, there is shown a salt cavern field 12, having a plurality of salt caverns such as caverns 10, 14, and 16. The field 12 is located in a salt formation 18 disposed below an overburden 22 made up of various geological formations. The salt cavern is generally preferred over the other types of underground caverns or formations previously discussed because of the impermeability of the salt. This impermeability prevents the escape of gas which may be placed within the salt cavern to achieve a controlled atmosphere therein.

Salt caverns can be developed in embedded formations or domes by conventional mining or by solution mining. Salt caverns 10, 14, and 16 in field 12 were developed by solution mining. Salt caverns 10, 14, and 16 of field 12, shown in FIG. 1, were formed by dissolving a portion of the salt from salt formation 18.

The preferred underground storage cavern is generally cylindrical with the cavern having a small diameter as compared to its height. Such dimensions are preferred for structural reasons and to facilitate outloading. A pressure test is performed to determine the integrity of the walls of the cavern.

Figure 2:
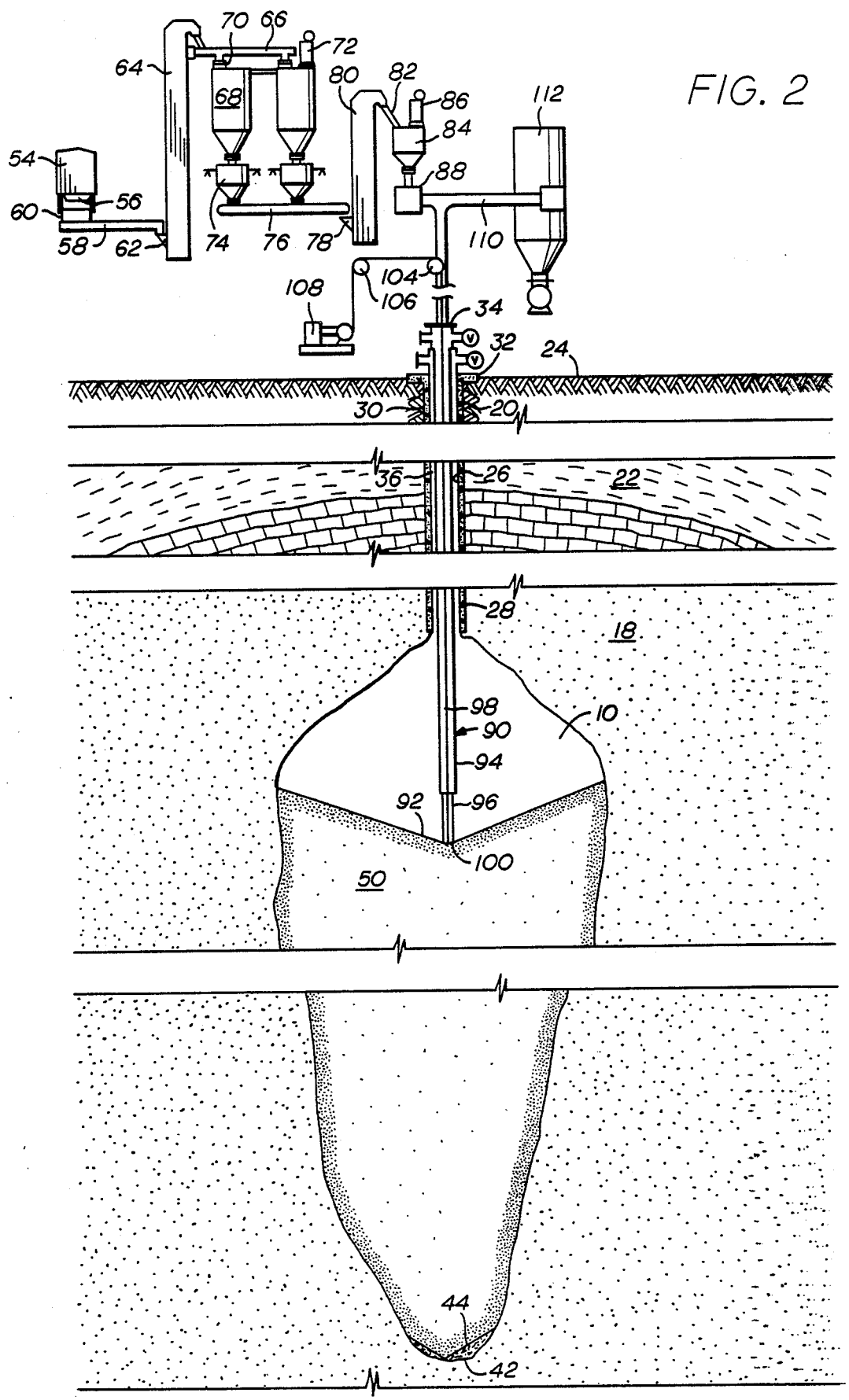
FIG. 2 is a schematic of an elevation view of an underground storage cavern with grain stored therein and apparatus for filling and outloading the storage cavern with grain by pressuring the cavern.

Referring now to FIG. 2, a well 20 is formed from the surface 24 by drilling through the overburden 22 and into the salt formation 18. A casing 26 is installed into the bore hole 28 of well 20 and is suspended at surface 24 by a wellhead 32. The annular space between the borehole 28 and casing 26 is filled with cement 30. Access to the flow bore of casing 26 and well 20 is permitted through wellhead 32 such as at 34.

Salt cavern 10 is formed by a leaching process conducted via well 20. In direct leaching, fresh water is fed down a production tubing (not shown) into salt cavern 10 to form brine. The brine is returned to the surface 24 through the annulus 36 formed between the production tubing and casing 26. As the fresh water leaches the salt, the salt cavern 10 is formed. In indirect leaching, fresh water is fed through the annulus and the brine is withdrawn through the flow bore of the production tubing. Leaching is well known to those skilled in the art.

Ideally, salt cavern 10 should be long and narrow but not too deep. The dimensions of salt cavern 10 can be engineered during the leaching process as for example, by the location of the lower terminal end of the production tubing within salt cavern 10. The preferred height of salt cavern 10 is between 100 and 150 feet with a diameter in the range of 50–75 feet. The depth limitations of the apparatus used to fill the cavern with grain and to remove the grain from the cavern will limit the depth of grain storage cavern 10. It is anticipated that the specific gravities of the various types of grain to be stored in cavern 10 are such that the pressure caused by the static head on the grain stored in the lowermost portions of cavern 10 will not cause damage to the grain. Studies have shown that wheat, for example, with a moisture content of less than 16% has not been damaged at pressures of approximately 300 PSI. However, damage caused by pressure on the grain may be a limiting factor in the ultimate height of an underground storage cavern.

Solution mining may cause insolubles and brine to remain at the bottom or floor 42 of cavern 10. Although a gas lift or submersible pump may be used to remove brine from cavern 10, there may still remain remnants of brine just above and below the insolubles layer. There is some question whether any small remaining amount of brine will be deleterious, especially to field grain, since brine is a common pickling agent. Rather than taking steps to insure that no brine remains at bottom 42, it may be less expensive to leave a sacrificial layer of grain at the bottom 42 of cavern 10. If the remaining brine and/or insolubles are found to be deleterious to the grain, this amount of grain would be lost. However, the use of narrow caverns will minimize this potential loss of grain in any event.

If the loss of grain is undesirable, one alternative approach includes driving an air-lift casing (appropriately filtered) some distance below the interface and into the insolubles. The air-lift, set into the insolubles, would lower the level of brine below the interface of the insolubles. Some insolubles would be lifted with the brine. Another alternative is to dispose crushed stone or other aggregate 44 at cavern bottom 42 to form a floor for cavern 10 to support the grain above any remaining insolubles or brine. Most insolubles will not harm or spoil the grain. Again, the brine may not pose a problem depending upon the ultimate use of the grain. Further, it may be determined that the amount of grain that is to be contaminated with brine may be an insufficient amount so as to be of no concern.

After the brine has been removed from the floor 42 of cavern 10, the air within cavern 10 would be displaced with a controlled atmosphere without oxygen, such as nitrogen, carbon dioxide or oxygen depleted air. In the preferred embodiment, nitrogen is the storage medium. Even though salt is impermeable, the cavern would be tested for tightness to insure that the controlled atmosphere would not escape.

The controlled atmosphere, nitrogen in the preferred embodiment, would totally displace the oxygen, i.e. air, in cavern 10. The lack of oxygen would totally eliminate insects and virtually eliminate the growth of any bacteria and fungi in cavern 10. Nitrogen would not leave a chemical residue. The nitrogen atmosphere would also eliminate the possibility of explosion or corrosion.

The dry nitrogen, which replaces the cavern air, will absorb approximately 1200 cubic feet of water at a typical salt ambient temperature of 80 degrees Fahrenheit. Thus, moisture is minimized in the cavern and thus, spoilage or deterioration of the stored grain due to external moisture is minimized. Further, the nitrogen will decrease the dampness of the walls of the cavern. The nitrogen in the cavern is maintained at a positive pressure, slightly above atmospheric. If the cavern is in fact dry before loading with grain, the nitrogen will then tend to remove moisture from the grain, thus improving its storage condition. As indicated previously, carbon dioxide or other gases may also be used as the controlled atmosphere, if desired.

Deterioration of the grain is greatly retarded by lowering the storage temperature as well as by the removal of oxygen. For example, with a 10% moisture content of the grain at a 10° Centigrade storage temperature, the half-life of the grain (time for germination to fall to 50%) goes up to approximately ten years even without a nitrogen atmosphere. Bulk grain is a relatively good natural insulator, having a thermal conductivity that is only three times that of standard insulating materials. Because of this insulating capability, grain stored at lower temperatures will take a long time to rise to the temperature of the surrounding salt. Therefore, in the present invention, the grain is cooled during the winter by circulating the nitrogen through a surface heat exchanger, dropping out moisture at the same time, and circulated through the grain. This is particularly useful where the grain must be stored for a long term, as with a permanent emergency reserve, or as a possible improvement in the storage of high moisture content grain or as an approach to dry the grain during storage. The low thermal conductivity of the grain will permit the maintenance of the cooler winter temperatures within cavern 10 year around.

The stored grain would initially be dried in a dryer to a 16% moisture content or less. A moisture content greater than 16% may cause caking so as to present a problem in retrieving or removing the grain 50 from the cavern 10. Where the grain is stored at field 12 having a plurality of caverns, the grain may be separated by quality and moisture content and stored in individual caverns. Further, grain could be mixed to a buyer's specification on removal from the caverns. Since drying is expensive, the nitrogen atmosphere is used to decrease the amount of drying required particularly for shorter term grain storage. The availability of natural gas or LPG storage on site would make drying at the storage facility more advantageous. Further, combustible hazardous waste held in temporary storage could also be used for the purpose of providing energy for the dryers.

In filling storage cavern 10 with grain 50, the grain is conveyed into the access 34 of the wellhead 32 whereby the grain is permitted to pass down through the casing 20 and into the cavern 10. The grain may be permitted to fall through the wellhead 32 and casing 26 down into the cavern 10 or through a pipe string, such as telescoping pipe string 90 hereinafter described in detail as a part of pnueumatic conveyance system for the grain. When grain is being transported in a pneumatic conveyance system, the flow of the grain will necessarily be turbulent, and the local, instantaneous particle velocities will be higher than the bulk (average) velocity of the conveying gas medium. Investigations have shown that the physical damage to the grain caused by pneumatic conveyance is comparable to that caused by mechanical conveyance if the velocity of the gas medium is held to less than 20 meters per second. Thus, the 20 meters per second represents a conservative (low) limit on velocity when examining the effect on grain falling to the bottom of cavern 10. The terminal velocity of a single grain falling in a nitrogen filled cavern at 2 atmospheres pressure is approximately 6 meters per second. Because of drag resistance, the grain can fall no faster than 6 meters per second even if it enters the cavern at a higher velocity. In summary, the fall of the grain into cavern 10 does not cause appreciable physical damage to the grain. Further, since the terminal fall velocity of the grain is inversely proportional to the square root of the pressure in cavern 10, the velocity can be slowed arbitrarily by increasing the storage pressure within cavern 10 if desired.

Referring to FIG. 2, a typical surface conveyance system is provided for conveying the grain to the wellhead 32 for the disposal of the grain 50 within cavern 10. The grain is transported to the site by bulk handlers, such as rail car 54 or truck (not shown). The rail car has one or more apertures 56 at the bottom thereof for passing the grain downwardly onto an unloading screw conveyor 58 positioned beneath the tracks 60 of rail car 54 or road bed in the case of a truck. Conveyor 58 moves the grain into a hopper 62 feeding a bucket conveyor 64 which transports the grain upwardly to feed a distribution screw conveyor 66 housed above one or more silos 68. Screw conveyor 66 includes one or more spouts 70 feeding the upper end of silo 68 with grain through an aperture in the top thereof. Silo 68 may include a bin vent or dust collector 72. In moving grain 50 from silo 68 to cavern 10, the grain may first be weighed in weigh hopper 74 prior to disposal on belt conveyor 76. The weigh hopper permits the determination of the amount of grain removed from silo 68. Belt conveyor 76 transports the grain to hopper 78 feeding the grain to bucket conveyor 80 having a spout 82 for passing the grain into a check weigh hopper 84 to monitor the amount of grain being disposed in cavern 10. Weigh hopper 84 may also include a bin vent or dust collector 86. The grain from weigh hopper 84 then passes through a receiver filter system 88 prior to being conveyed to wellhead 32.

As will be discussed further with respect to FIG. 5, the nitrogen or other compressor gas is stored in a gas header 61. A plurality of nitrogen compressor units 63 compress the nitrogen for passage into a receiver (not shown) to store the nitrogen at up to 110 to 125 PSIG. Nitrogen coolers 65 are provided to cool the nitrogen to the desired temperature. A system control panel (not shown) is provided to control this equipment. As will be discussed hereinafter, a secondary filter 67 is provided for the nitrogen being recirculated from storage cavern 10. The nitrogen circulation system controls the nitrogen pressure, temperature, and circulation rate into the storage caverns of field 12.

Monitoring equipment is provided to monitor the pressure, temperature, and circulation rate of the nitrogen. Samples of the grain will be retrieved from time to time during storage for analysis. The results of such analysis may predicate changes in the storage conditions, i.e., nitrogen temperature and pressure.

If cavern 10 is used for short-term storage, it will be necessary to provide both load and outload equipment at the site. However, if the caverns in field 12 are used principally for the storage of surplus grain only, then outload equipment might not be immediately required if the grain is to be stored long term, such as ten to twenty years. For the present invention to be utilized in a cavern field 12, one or more storage caverns may be held in reserve pending the need to store additional grain. One option would be to store hydrocarbons,. such as natural gas, in these storage caverns for later conversion into grain storage if demand dictates. Although unconverted caverns could remain empty until converted, cost savings would be achieved by storing other products.

The present invention includes the further advantage that the underground storage caverns have only one access as compared to surface storage with multiple accesses. The single access permits easy maintenance, control and monitoring of the grain being loaded or outloaded from the cavern. The single access also reduces construction and handling costs as well.

Referring again to FIG. 2, there is shown the low pressure outload system for loading and outloading the grain 50 from cavern 10. The low pressure outload system includes a telescoping pipe 90, approximately 200 feet in length, which is maintained directly above the level 92 of the grain 50 stored in underground storage cavern 10. The telescoping pipe 90 includes a plurality of concentric pipes, such as 6 inch pipe 96 and 5 inch pipe 94, having decreasing diameters. The diameter of inner pipe 96 is sized to be telescopingly received within outer pipe 94. Telescoping pipe 90 extends from above wellhead 32, through the last cemented casing 26, and into underground storage cavern 10. One or more cables 98 are attached to the terminal end 100 of telescoping string 90. The cable 98 extends upwardly through the annulus 36, created between the casing 26 and telescoping string 90, to a series of pulleys 104, 106 located at the surface 24 and is connected to a telescope hoist 108 for raising and lowering the telescoping pipe 90. By tensioning the cable 98 from the surface using hoist 108, the free end 100 of the telescoping pipe 90 may be moved from side to side within the cavern 10 should caking occur in the grain surrounding the lower end 100 of the telescoping pipe 90.

In outloading the grain 50 from cavern 10 using the low pressure outload system, the underground storage cavern 10 is pressurized to a predetermined pressure. In the preferred embodiment, this pressure is between 50 and 60 PSIG when lifting the grain 50 from a depth of up to 850 feet. The low pressure outload system can include a booster gas system (not shown) which would be activated to increase the "lift" in the telescoping pipe 90. The cavern 10 is pressurized utilizing the booster gas system by flowing nitrogen down through the annulus 36. The end of the telescoping pipe is located a matter of inches above the upper surface of the stored grain. As nitrogen is pressurized down the annulus 36 and pressure is lowered within the telescoping string 90, the grain is pneumatically conveyed up the flow bore of the telescoping string 90 to the surface 24.

After the grain reaches the surface 24, it is conveyed through ducts 110 and into a gas-material separator 112. The grain is then conveyed to selected silos, such as silos 68 shown in FIG. 2. The nitrogen gas will exit the silo 68 via a bag-type dust collector like that of 72 shown in FIG. 2. The dust collector 72 is controlled by a variable cycle timer (not shown) which will pulse nitrogen into the bags to clean them. The nitrogen gas then enters a secondary or backup filter (not shown) which will include a differential pressure switch that will sense a dust build up. This would occur in the event of a bag rupture or other malfunction of the primary dust collector 72 on the silo 68. In the event that the differential pressure switch on the secondary filter (not shown) is activated, the low pressure outload system will automatically divert the grain flow to another silo.

Figure 5:
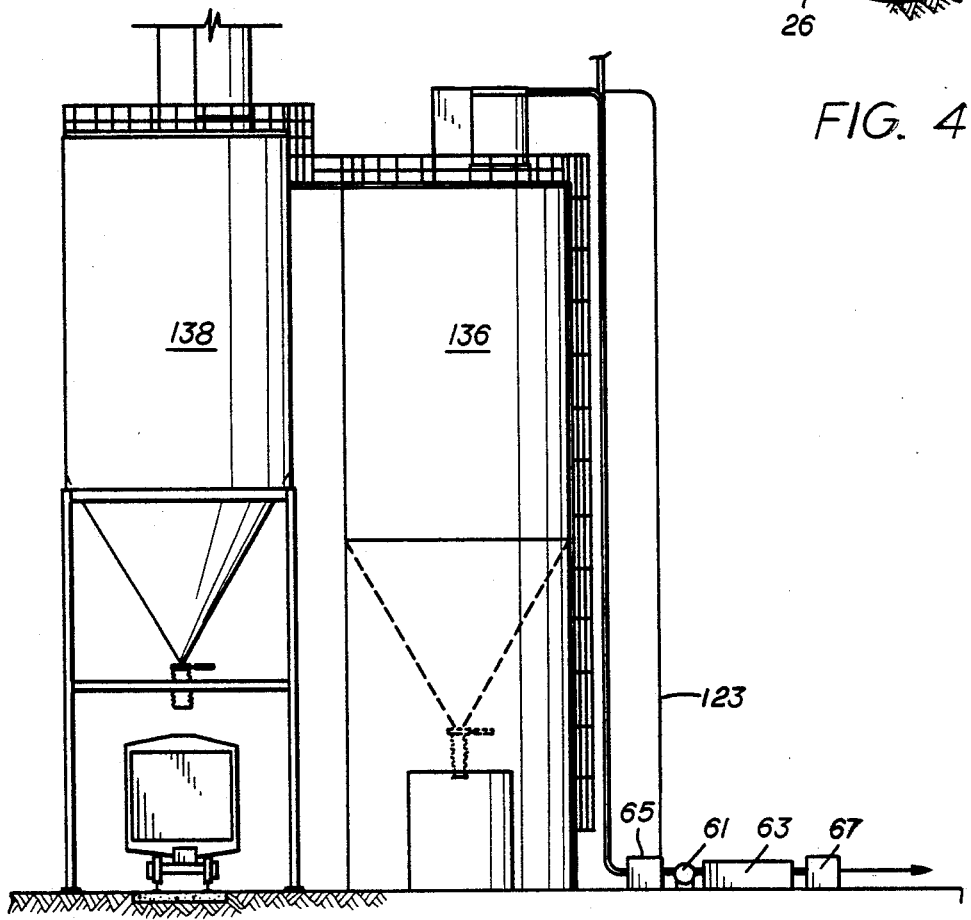
FIG. 5 is a schematic of an elevation view of the apparatus and method used in combination with that shown in FIG. 3 for the nozzle outload apparatus and method.

Following the secondary filter, the nitrogen gas will enter a compressor, such as that of 63 shown in FIG. 5, and then an aftercooler, such as that of 65 shown in FIG. 5. The compressor gas will go into a receiver to store the gas at up to 110 to 125 PSIG.

By adjusting the flow of the conveying gas, the actual rate of grain withdrawal may be increased or decreased within limits. Rates of 5,000 bushels per hour are obtainable with the low pressure outload system. The rate of course will depend upon the drive pressure, i.e. cavern pressure, used and upon the diameters of pipes 94, 96. Five thousand bushels per hour will empty a typical underground storage cavern in seven and one-half days. Federal standards require that the storage facility complete outloading in thirty days.

Figure 4:
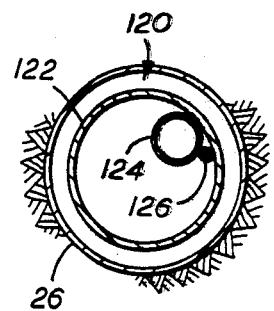
FIG. 4 is a cross-section of the plane at line 4—4 shown in FIG. 3.
Figure 3:
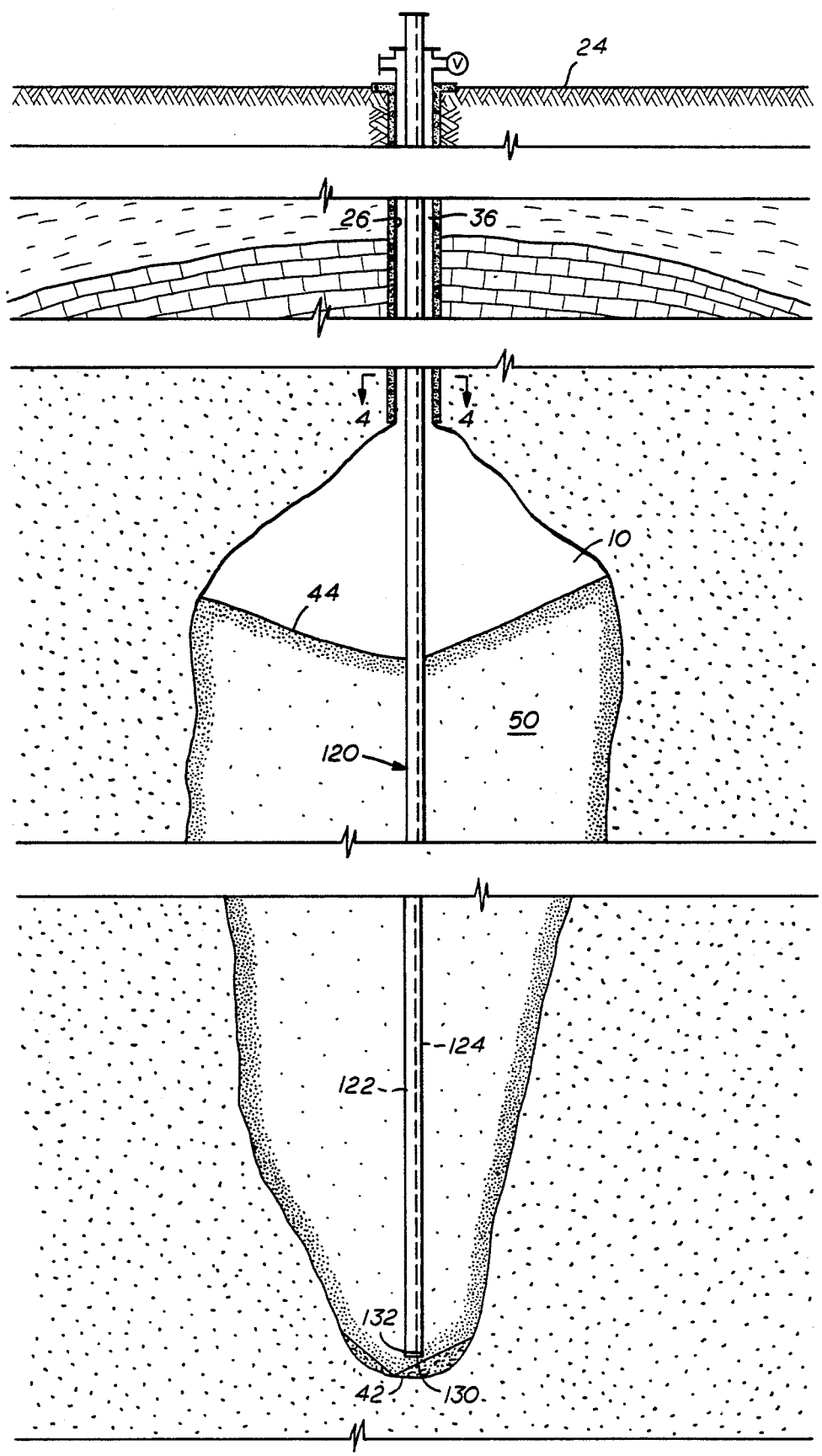
FIG. 3 is a schematic of an elevation view of the underground grain storage facility of FIG. 2 utilizing the nozzle outload apparatus and method by supplying pressure to the nozzle.

Referring now to FIG. 3 and 4, there is shown an alternative outload method. The nozzle outload system shown in FIG. 3 includes a fixed hanging assembly 120 made up of a bundle of pipes extending from the surface 24, down through the casing 26 to the bottom 42 of cavern 10. The hanging assembly 120, best shown in FIG. 4, includes a large 6 to 10 inch conveying pipe 122 for lifting grain from cavern 10, a 3 inch nitrogen supply line 124 and a ½ inch diameter pilot control line 126. Nitrogen supply line 124 and pilot control line 126 are affixed to the inside of the conveying pipe 122 by welding or by mechanical means. As shown in FIG. 3, a nozzle 130 is disposed at the lower terminal end 132 of conveying pipe 122. The injection of gas into nozzle 130 from nitrogen supply line 124 creates a low pressure region at the rim of nozzle 130 thereby sucking the grain into the terminal end 132 of conveying pipe 122 and upward within the pipe with the expanding gas from supply line 124. The gas passing through the high pressure line and exiting the jets of the nozzle creates a venturi effect at the lower end of the string. As gas is pressurized to jet down the supply line 124, the grain, due to the venturi effect, flows into the lower end of the conveying pipe 122 and then to the surface 24. As the grain is removed, other grain sinks downward towards the nozzle 130. The stored grain 50 has an angle of repose, whereby the grain 50 will have a tendency to flow to the center of cavern 10 for ease of removal by the nozzle outload system. It is estimated that an approximately 27 degree angle of repose will be established for most grains.

Conveying pipe 123 extends above surface 24 for ground delivery of grain 50 to one of a plurality of silos 136, 138 shown in FIG. 5. The silos, for example, may be 26 feet in diameter, 38 feet high, and have a 60 degree cone bottom and a 12 inch outlet. For illustration purposes, silo 136 has been fully skirted with two 12 feet wide by 14 feet high truck drive-through openings. Silo 138 is mounted on a structural steel support platform over a railroad track to load and unload railroad cars. The silos 136, 138 are suspended on structural steel support frames over the driveway for the trucks and the tracks for the rail cars.

Silos 136 and 138 are typical in the industry and include flow pads in the cone to aid discharge of the grain; level controls; full perimeter guard rails with toeboards at top; a ladder for the silos; interconnecting crosswalks at the top; and retractable loading spouts at the discharge. Twenty inch combination manway/pressure/vacuum relief valves are typical on each of the silos. A bin vent, reverse pulse cleaning dust collector is also provided for each silo.

The recovery or removal of the grains from underground storage cavern 10 will be achieved at close to 100%.

In the nozzle outload system where the hanging string extends from the surface to the floor 42 of the cavern 10, it may be advantageous to circulate cold nitrogen through the supply line 124, and thus keep the temperature of the grain around 30 degrees. Since grain is a good insulator, it will therefore stay cold longer. At the surface, the nitrogen may be recirculated through a heat exchanger for energy conservation.

The present invention includes the following advantages:

(1) A substantial reduction in storage costs as compared to conventional means;
(2) The elimination of the possibility of an explosion due to the use of nitrogen or other oxygen-free gas;
(3) The ability to control the temperature of the grain;
(4) The ability to dry the grain to reduce its moisture content;
(5) The elimination of pests and bacteria in the stored grain without the introduction of dangerous agents; and
(6) The enhanced security of the grain being stored underground—protection from both man made and natural disasters.

While a preferred embodiment of the invention has been shown and described, modifications thereof can be made by one skill of the art without departing from the spirit of the invention.

I claim:

1. A structure for the storage of grain, comprising:
an enclosed subterranean cavern which has earthen walls that are substantially gas impermeable;
a controlled atmosphere with substantially no oxygen within said enclosed cavern;
a controlled access into said enclosed cavern;
means for loading said cavern with the grain; and
means for unloading the grain from said cavern.

2. The structure of claim 1 wherein said cavern is a salt cavern.

3. The structure of claim 1 wherein said cavern is a cavern in hard rock.

4. The structure of claim 1 wherein said cavern is a mine.

5. The structure of claim 1 wherein said cavern is an underground cavern formed by the solution mining of a dissolvable deposit.

6. The structure of claim 1 further including means for removing moisture from within said cavern.

7. The structure of claim 1 wherein said controlled atmosphere is nitrogen.

8. The structure of claim 1 wherein said controlled atmosphere is carbon dioxide.

9. The structure of claim 1 wherein said controlled atmosphere is a gas without oxygen.

10. The structure of claim 1 wherein said controlled atmosphere is oxygen depleted air caused by the natural respiration of the grain and included organisms.

11. The structure of claim 1 further including means for circulating said gas within said cavern.

12. The structure of claim 10 further including means for cleaning, cooling, and pressurizing said gas.

13. The structure of claim 1 further including means for controlling temperature within said cavern.

14. The structure of claim 1 further including means for drying the grain stored within said cavern.

15. The structure of claim 1 further including means for cooling the grain stored within said cavern.

16. A structure for the storage of grain, comprising:
a subterranean cavern which has earthen walls that are substantially gas impermeable;
a controlled atmosphere with substantially no oxygen within said cavern;
an access from the surface into said cavern;
means for loading said cavern with the grain;
means for unloading the grain from said cavern; and
said access including a plurality of concentric pipes extending from the surface into said cavern.

17. A structure for the storage of grain, comprising:
a subterranean cavern which is substantially gas impermeable;
a controlled atmosphere with substantially no oxygen within said cavern;
an access from the surface into said cavern;
means for loading said cavern with the grain;
means for unloading the grain from said cavern; and
said controlled atmosphere being a gas without oxygen and said access including a plurality of concentric pipes extending from the surface into said cavern; and means for circulating said gas through the flow bore and annulus of said concentric pipes to control the temperature and pressure within said cavern.

18. The structure of claim 1 wherein said loading means includes means for conveying the grain to said access whereby the grain is dropped through said access into said cavern.

19. A structure for the storage of grain, comprising:
a subterranean cavern which has earthen walls that are substantially gas impermeable;
a controlled atmosphere with substantially no oxygen within said cavern;
an access from the surface into said cavern;
means for loading said cavern with the grain;
means for unloading the grain from said cavern; and
said unloading means including a pipe string extending from the surface, through said access, and into said cavern to a point just above the stored grain; and means for increasing the pressure in said cavern to a pressure above the pressure within the flow bore of said pipe string whereby the grain flows up said pipe string to the surface.

20. The structure of claim 19 wherein said controlled atmosphere is pressurized through said access to increase the pressure within said cavern.

21. The structure of claim 19 further including means connected to the lower end of said pipe string for raising and lowering said pipe string within said cavern.

22. A structure for the storage of grain, comprising:
a subterranean cavern which is substantially gas impermeable;
a controlled atmosphere with substantially no oxygen within said cavern;
an access from the surface into said cavern;
means for loading said cavern with the grain;
means for unloading the grain from said cavern; and
said unloading means including a pipe string extending from the surface, through said access, and into said cavern to a point just above the bottom of said cavern; and means for creating a venturi effect at the lower end of said pipe string for conveying the stored grain to the surface through said pipe string.

23. The structure of claim 22 wherein said pipe string includes a conveying pipe and a gas supply pipe; said gas supply pipe supplying pressurized gas without oxygen to said lower end of said conveying pipe thereby creating a venturi effect.

24. The structure of claim 23 wherein said pipe string further includes a pilot pipe.

25. The structure of claim 22 wherein said pipe string includes a nozzle at the lower end of said pipe string.

26. A structure for the storage of grain, comprising:
a subterranean cavern having earthen walls that are substantially gas impermeable, said walls forming an enclosure in which the grain is housed;
a controlled atmosphere with substantially no oxygen within said subterranean cavern;
a controlled access extending externally of said cavern and into said enclosure, said controlled access preventing the ingress of air into said subterranean cavern; and
means for circulating a gas without oxygen through said access and into said subterranean cavern, said substantially gas-impervious walls preventing the escape of said gas.

27. The structure of claim 26 further including means for loading and unloading said gain from said enclosure.

28. The structure of claim 26 wherein said access includes a plurality of concentric pipes extending into said enclosure.

29. A combination comprising:
grain;
a subterranean cavern having earthen walls that are substantially gas impermeable, said walls forming an enclosure in which said grain is housed;
a controlled atmosphere with substantially no oxygen within said enclosure;
a controlled access extending externally of said cavern and into said enclosure; and
means for circulating a gas without oxygen through said access and into said enclosure.

* * * * *